United States Patent [19]

Moore

[11] 4,017,943
[45] Apr. 19, 1977

[54] BRACKET AND CLIP FOR MOUNTING A CROSS-BAR TO A BRACKET

[75] Inventor: David M. Moore, Pittsburgh, Pa.

[73] Assignee: Armstrong Store Fixture Corporation, Pittsburgh, Pa.

[22] Filed: Feb. 9, 1976

[21] Appl. No.: 656,142

Related U.S. Application Data

[63] Continuation-in-part of Ser. No. 544,968, Jan. 29, 1975, Pat. No. 3,965,540.

[52] U.S. Cl. .................... 24/84 R; 248/221.3; 403/217; 248/224.4
[51] Int. Cl.² ................................ A44B 13/00
[58] Field of Search ............ 24/84, 87, 84 A, 84 B, 24/84 C, 84 H, 84 R; 312/26; 215/300; 211/89, 123, 105.1; 248/226 E, 251, 316 D

[56] References Cited
UNITED STATES PATENTS

| | | | |
|---|---|---|---|
| 733,945 | 7/1903 | Connolly | 24/84 R X |
| 1,221,738 | 4/1917 | Isom | 248/226 E X |
| 1,858,656 | 5/1932 | Batherman | 248/316 D UX |
| 1,876,026 | 9/1932 | Schinkal | 24/84 B |
| 2,881,766 | 4/1959 | Tornsjo | 248/316 D UX |
| 3,269,553 | 8/1966 | Ruhnke | 211/150.1 |
| 3,685,662 | 8/1972 | Varon et al. | 211/150.1 |
| 3,836,106 | 9/1974 | Gray | 248/226 E X |

FOREIGN PATENTS OR APPLICATIONS

| | | | |
|---|---|---|---|
| 1,505,538 | 11/1967 | France | 312/263 |
| 1,293,250 | 10/1972 | United Kingdom | 24/84 R |

*Primary Examiner*—Paul R. Gilliam
*Assistant Examiner*—A. M. Calvert
*Attorney, Agent, or Firm*—Parmelee, Miller, Welsh & Kratz

[57] ABSTRACT

A bracket and clip for supporting an end of a cross-bar on which merchandise display hooks are placed comprises a bracket with a clip-supporting portion at right angles thereto. The clip-supporting portion has a small rectangular opening therethrough below the vertical center thereof. A molded plastic clip has a top portion with a depending main wall intermediate its ends, the top and the main wall at the bottom having cooperating cross-bar-holding means thereon. At the back of the top there is a depending, somewhat resilient clip portion arranged to frictionally clamp the clip-supporting portion of the bracket tightly against the depending main wall while a projection on the free end of the depending clip portion enters the opening in said clip-supporting portion of the bracket to prevent accidental or unauthorized removal of the clip from the bracket.

4 Claims, 5 Drawing Figures

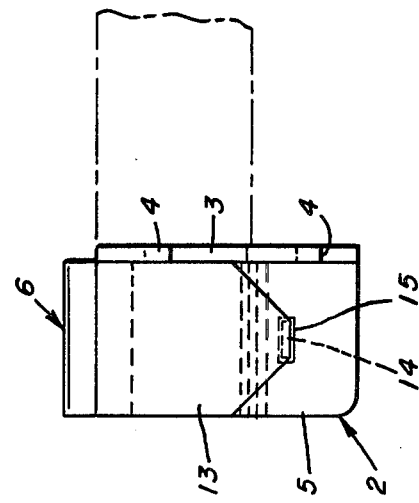
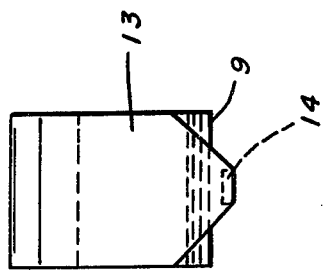
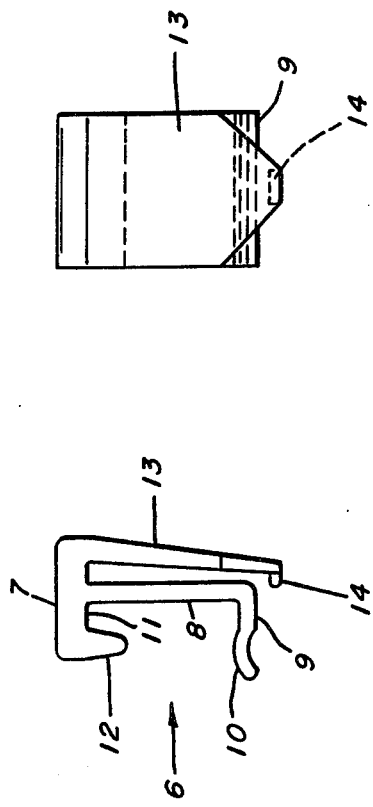
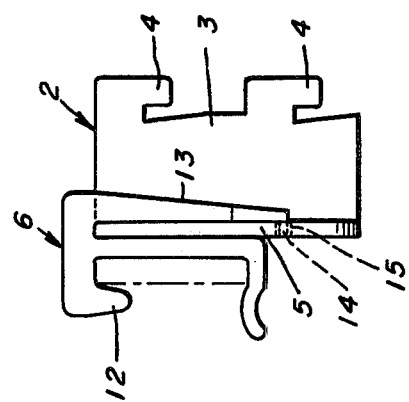
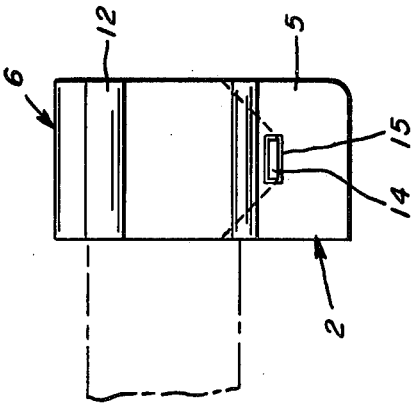

BRACKET AND CLIP FOR MOUNTING A CROSS-BAR TO A BRACKET

This application is a continuation-in-part of my application Ser. No. 544,968 filed Jan. 29, 1975 for a Clip for Mounting a Crossbar to a Bracket, now issued as U.S. Pat. No. 3,965,540 dated June 29, 1976, which, so far as it is relevant, is incorporated herein by reference.

As disclosed in said application there is a molded clip of resilient plastic such as polycarbonate with a top or upper portion having a depending wall between its ends. At its lower end the depending wall has forwardly-extending ledge with a rounded raised rib spaced outwardly from but parallel with the lower edge of said wall. Said top portion of the molded clip has a forwardly-extending overhang with a depending lip that is positioned above the rib on said ledge portion. The arrangement is such that a cross-bar of rectangular section may have its upper edge inserted under the overhang and the lower edge is then forced in over the rib on the ledge and is thus firmly clamped against said depending wall between the overhang at the top and the ledge at the bottom.

At the rear edge of said upper portion there is a depending resilient clip element, the upper end of which is spaced from the depending wall a distance about equal to the thickness of the metal bracket over the edge of which the clip is to be applied. This clip element converges downwardly toward the said depending wall so that it had to be sprung outwardly into parallelism with the said depending wall when the clip is fitted over a metal bracket to provide a firm grip of the clip on the bracket.

Even then there was a possibility of the cross-bar being struck from below, raising the clip on the bracket or even detaching it from the bracket. To prevent this my said application disclosed extending the depending resilient clip element to a level where a lip formed on the free bottom edge of the clip element would extend under the lower edge of the bracket. This necessitated the use of considerably more plastic in each complete clip and even then the holding power was not good because of the ease with which the extended length of plastic forming the resilient element of the clip could be flexed.

The present invention provides an improvement wherein the resilient clip element is of a length to extend a short distance below the level of the ledge on the depending wall member and its end portions has a nib or protrusion thereon positioned to snap into an opening through the metal bracket when the clip is in position on the bracket. Thus the present invention involves modifying the bracket for cooperation with the clip, and when the clip and bracket are once properly assembled, removal of the clip from the bracket can only be effected by the use of tools, and accidental removal is virtually impossible.

The invention may be more fully understood by reference to the accompanying drawings showing a preferred embodiment of the invention, and wherein:

FIG. 1 is a side elevation of the clip apart from the bracket;

FIG. 2 is a rear elevation of FIG. 1;

FIG. 3 is a side elevation of the clip of FIG. 1 applied to a bracket;

FIG. 4 is a rear elevation of FIG. 3; and

FIG. 5 is a front elevation of FIG. 3.

Referring to the drawings, and first with particular reference to FIGS. 3 to 5 inclusive, 2 designates a bracket having an arm 3 with a terminal portion 4 arranged to hook into openings on a vertical mounting strip (not shown) and hold the arm 3 in a horizontal position perpendicular to the wall or other supporting surface to which the mounting strip is attached. The arm has a clip supporting outer portion 5 at its outer end which is at right angles to the arm 3 and which is in a vertical plane parallel with the wall or other surface from which the arm 3 projects, all as fully shown and described in my said copending application.

The bar holding clip 6, like the clip of said copending application, is formed of a stiff but somewhat resilient plastic, such as polycarbonate. It has a top portion 7. Intermediate the ends of the top portion there is a depending wall 8. The lower end of this wall terminates in a forwardly-projecting ledge 9 across which there extends a ridge or rib 10 spaced outwardly from the wall 8.

The top portion 7 has an overhang 11 extending forwardly from the top of the wall 7 extending over the ledge 9, this overhang terminating in a depending lip portion 12 which is positioned above the rib 10. The arrangement is such that with the cross-bar of rectangular section having its upper edge positioned behind the lip portion 12, the lower edge of the bar can be forced in over the ridge 10 and be resiliently confined in a vertical plane close against the depending wall 8.

The top portion 7 of the clip extends rearwardly from the pland of the vertical wall 8 a distance approximately equal to the thickness of clip-supporting outer portion 5 of the bracket 2, and then has a turned-down clip extension 13 that normally coverges toward the rear surface of the depending wall 8. It is of downwardly-decreasing thickness and near its lower end its width tapers to a narrow tab which, however, is thickened to provide a projection 14 of generally rectangular shape that protrudes toward the plane of the depending wall 8 but it is positioned below the ledge 9 forming the lower end of said wall.

In use, the clip is forced over the top edge of the clip-supporting portion 5 of the bracket, springing the clip-extension 13 away from the depending wall 8 as the clip fits over and slides down portion 5 of the bracket. When the clip is fully in position with the top edge of the clip-supporting portion 5 against the underside of the top portion 7 of the clip and the clip can then be pushed down no further, the projection 14 on the clip extension 13 will snap into a matching rectangular hole 15 in the clip-supporting portion 5 of the bracket. When this occurs the clip cannot be removed except by forcing the projection 14 back out of the hole 15 while simultaneously sliding the clip upwardly on the bracket. The size of projection 14 and the dimensions of openings 15 are too small to enable the projection to be pushed back through the hole with one's fingers so that a tool of some sort is required. Such removal of the clip from the bracket cannot occur accidentally nor can a meddlesome visitor to the store where the fixture is used do it.

The resilient clip extension 13 is shorter than that of the corresponding element in my copending application, and because of that fact, less weight of plastic is required in the present clip and becuse of the clip extension being shorter from its juncture with the top of the clip to the tip in the present construction the pressure required to remove the projection 14 from the opening 15 is applied through a shorter and therefore more resistant leverage. This also enables less weight of plastic to be more effectively used than is required by the construction in FIGS. 4, 5 and 6 of my said earlier application.

The length of the clip extension 13 from the top 7 to the tip and the location of the opening 15 in the clip-supporting portion of the bracket is such that when the clip is fully in position on the clip-supporting portion 5 of the bracket with the projection 14 entered in the opening 15, the opening 15 will be visible and accessible for the insertion of a releasing tool just below the ledge 9 at the bottom of wall 8.

The present invention brings about a new combination and inter-relationship between the clip and the bracket through the interlocking relation of the clip and the bracket which results not only in a saving of material, but an improved security against accidental or unauthorized removal of the clip from the bracket. While I have shown a bracket and clip for only one end of a cross-bar, a mating bracket and clip are provided for the other end, and possibly intermediate portions, all as fully explained in said earlier application.

I claim:

1. A bracket and clip construction for supporting a cross-bar on which merchandise display hooks or the like are mounted comprising:
   a. a clip element having a top portion and a depending wall and a clip element at the rear of the top portion extending downwardly from the top portion alongside of the depending wall, the clip element being resiliently flexible in a direction away from the depending wall to frictionally grip an object inserted between the clip element and the depending wall,
   b. the bracket having an arm for attachment to a support and a clip-supporting portion with upper and lower edges and of a thickness to be received between the depending wall of the clip and said clip element by springing the clip element in a direction away from the depending wall,
   c. the bracket having an opening through the clip-supporting portion thereof and the clip having a projection on the clip element adapted to fit into said opening, the opening and projection being so positioned that the projection will enter the opening only when the clip is positioned on the clip-supporting portion of the bracket with the clip forced over the clip-supporting portion of the bracket to the full limit of movement provided between the clip element, the depending wall, and the top portion of the clip, said clip element being longer than the depending wall portion with the projection being on the terminal portion of the clip element, said opening in the clip supporting portion of the bracket arranged to receive said projection being located below the lowermost edge of said depending wall portion and above the lower edge of the clip-supporting portion,
   d. the clip having attaching means forwardly of the depending wall for securing a bar thereto.

2. The bracket and clip combination defined in claim 1 in which the projection is generally rectangular in shape and the opening is of a corresponding shape and size to receive the projection.

3. The bracket and clip combination as defined in claim 1 in which the clip element decreases in thickness from the top toward the bottom and its lower end is tapered in width downwardly toward its lower end with said projection being at the narrowest portion of the lower end.

4. The clip and bracket combination as defined in claim 1 in which the bar-holding mmeans comprises a ledge projecting forwardly from the forward surface of the depending wall at its bottom with the ledge having a ridge thereacross located forwardly of the plane of the depending wall together with an overhang on the top portion of the clip positioned above the ledge with a lip that projects down in a plane above the ridge, the opening in the clip-supporting portion of the bracket being just below the level of said ledge on the lower edge of the depending wall.

* * * * *